March 8, 1938.                C. J. RINDT                2,110,341
                        FISH SCALING APPARATUS
                Filed March 29, 1937        2 Sheets-Sheet 1
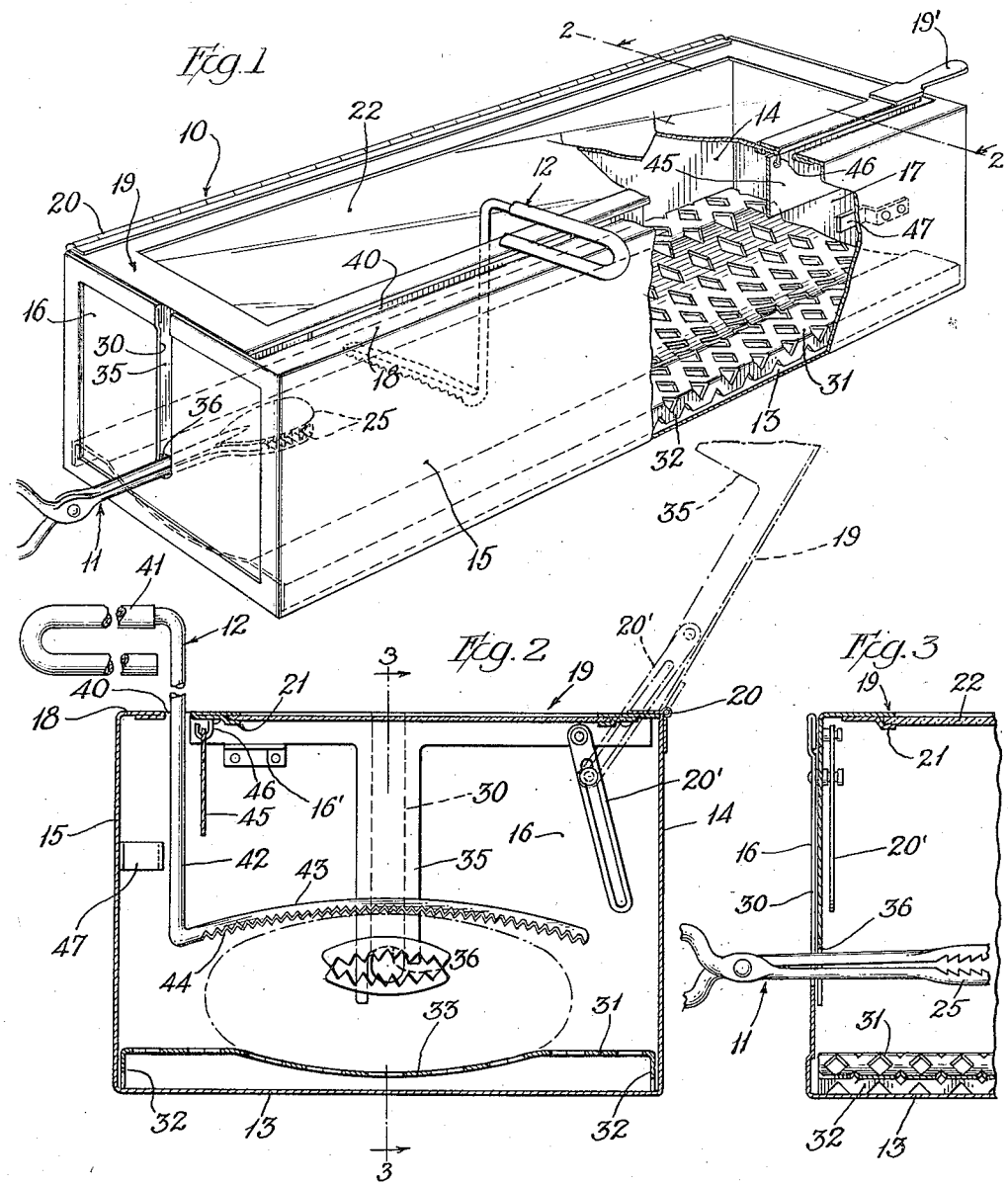
Inventor
Carl J. Rindt
Ferd Bing
Attorney

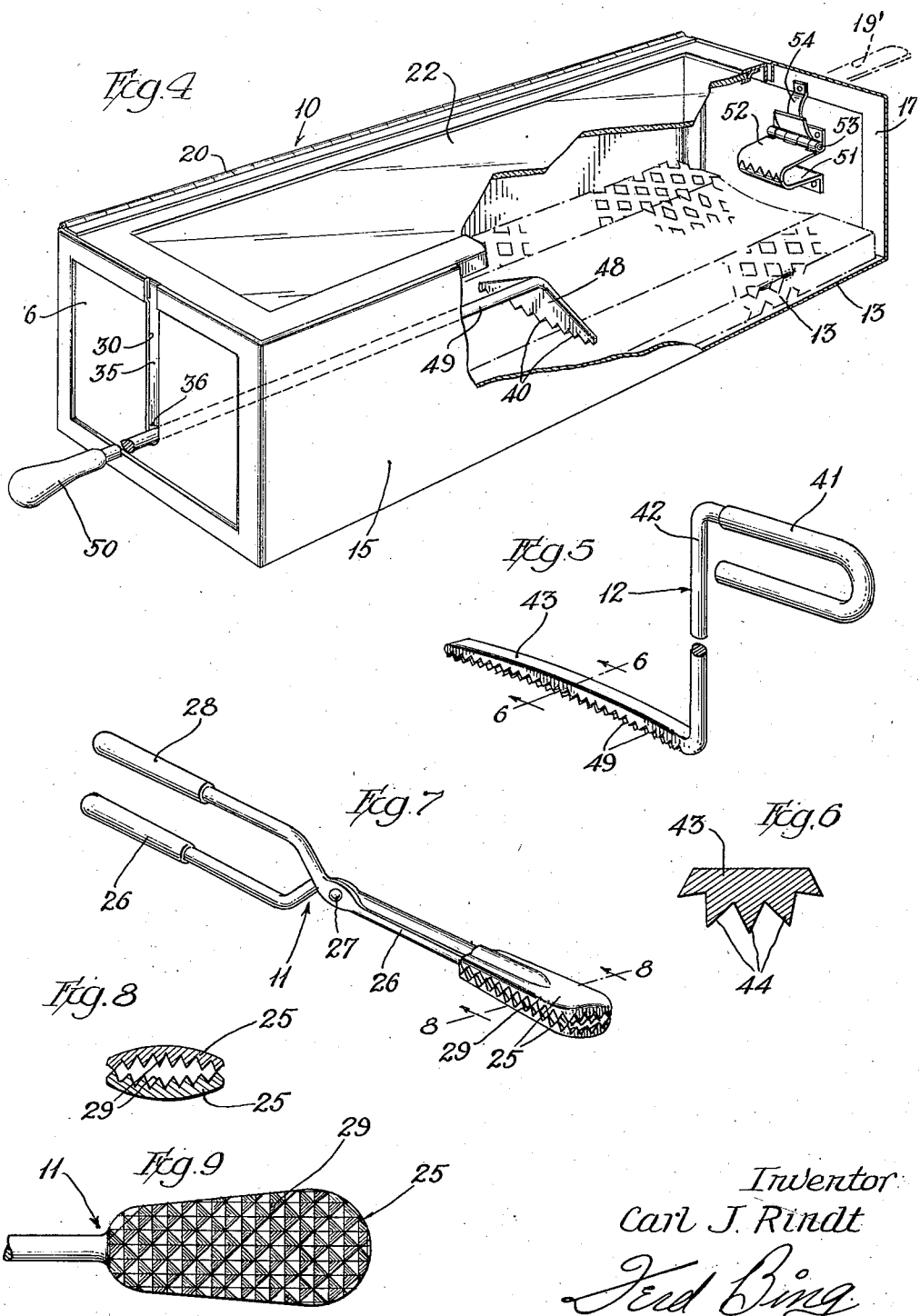

Patented Mar. 8, 1938

2,110,341

UNITED STATES PATENT OFFICE 2,110,341

FISH SCALING APPARATUS

Carl J. Rindt, Chicago, Ill.

Application March 29, 1937, Serial No. 133,555

14 Claims. (Cl. 17—5)

The invention relates generally to the art of preparing fish for sale or use, and more particularly it relates to means for removing the scales from fish.

To those familiar with the marketing of fish, it is well known that there is a definite sales resistance effective against the handling and sale of scale fish in retail stores and markets and this is particularly true in the middle west or lake fish area. In the retail marketing of scale fish it is considered to be the best practice to defer the scaling operation until the actual sale of the fish to the customer, since it allows the scales to continue in their natural protective function as long as possible, thereby to aid in preserving the fish. This practice, however, involves frequent scaling operations, and after each operation the clerk must thoroughly wash his hands before handling other foods. The above mentioned sales resistance is due, in part, to the inconvenience caused by such frequent scaling operations interspersed with other work, and is also attributable in part to the trouble and work involved in scaling such fish, and in cleaning up the scales which normally fly about the room and onto the workers' clothes during the scaling operation. The lodging of the scales on and about the store fixtures forms one of the most serious objections to the scaling of fish in stores, since it is almost impossible to locate and remove all of the scales which ordinarily fly about the room. The result is that the scales, at least in small quantities, putrefy, causing an objectionable odor about the store. In such stores most clerks also object to handling fish to the extent required to perform a proper scaling operation. These objections also apply with equal force to the scaling of fish in the home, meat markets and restaurants.

In view of these objections to the merchandising and use of scale fish, an important object of the present invention is to provide a new and improved fish scaling apparatus whereby fish may be scaled quickly, easily and thoroughly while confined within a simple and easily cleanable enclosure which arrests the flight of the scales and protects or shields the worker as well as the premises.

Another object is to provide such a completely housed fish scaling apparatus which is simple and economical in construction and with which the worker may continually watch the progress of his work so as to insure proper and complete scaling of the fish with the minimum of effort.

A further object is to provide such a fish scaling apparatus having new and improved means for lifting and manipulating the fish during the scaling operation without actually touching the fish with the hands.

Another object is to provide such apparatus which the worker may also employ to manipulate the fish while performing a cleaning operation thereon.

A further object is to provide a device of this character constructed to facilitate the positioning and manipulation of the fish during the scaling operation.

Other objects and advantages will become apparent from the following description, taken in connection with the accompanying drawings in which:

Fig. 1 is a perspective view of a preferred form of the enclosure of the invention, a portion of the enclosure being broken away to show the interior construction.

Fig. 2 is a cross-sectional view taken along the line 2—2 of Fig. 1.

Fig. 3 is a view of a portion of the device taken along the line 3—3 of Fig. 2.

Fig. 4 is a perspective view of an alternative form of the invention.

Figure 5 is a perspective view of the scaler device of the embodiment of Fig. 1.

Fig. 6 is a sectional view taken along the line 6—6 of Fig. 5.

Fig. 7 is a perspective view of the fish holding device of Fig. 1.

Fig. 8 is a sectional view taken along the line 8—8 of Fig. 7.

Fig. 9 is a view of one of the jaws of the holding device.

While I have shown in the drawings and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

In the form chosen for disclosure in Figs. 1 to 3 and 5 to 9 the invention is embodied in a fish scaling apparatus having an easily cleanable enclosure such as a box 10 adapted to enclose a fish to be scaled, together with a holder 11 operable to manipulate and turn the fish over, and a scaler or scraper device 12 operable from the exterior of the closed box so as to remove the scales while the fish is completely housed by the box. Being thus fully enclosed during the scaling operation the scales fly against and lodge on the various interior surfaces of the box 10 so that the work of cleaning up after the scaling operation consists merely in the washing and sterilizing of the box 10, the holder 11 and the scaler 12.

As illustrated herein the box 10 is of elongated form with a bottom 13, and inter-connected rear and front walls 14 and 15 and end walls 16 and 17, all of these walls, as well as the other elements of the apparatus, being preferably formed from a rust proof metal so as to simplify the use and cleaning of the device. These walls thus define an open topped receptacle with its top opening defined by the upper edges of the side wall 14 and the end walls 16 and 17 and by the edge of an inwardly or rearwardly extending flange 18 on the front wall 15. To close the open top of the box 10 during the scaling operation, a shiftable cover 19 is provided, the cover preferably being hinged as at 20 to the upper edge of the rear wall 14. A stop link mechanism 20' is preferably provided to limit the opening movement of the cover as illustrated in dotted outline in Fig. 2 of the drawings. Closing movement of the cover 19 is in the present instance limited by brackets 16' fixed on the end walls of the box, as shown in Fig. 2.

Since the present invention contemplates and provides for the scaling of the fish while completely enclosed in the box 10, there is provided a transparent window means whereby the user is able to watch the progress of the scaling operation. This window means is preferably incorporated in the cover 19, and to this end the cover has a central opening 21 (Fig. 2) of substantial size, and this opening is spanned by a transparent sheet 22 of a material such as celluloid or glass.

On one end of the cover 19 a handle 19' is provided whereby the cover may conveniently be raised to its open position, and when the cover has been so opened a fish may be placed within the box for scaling. In the form illustrated in Figs. 1 to 3 the fish may be lifted and placed in the proper position within the box without touching the fish with the hands, and this result is accomplished by means of the holder 11 which is shown in detail in Figs. 7 to 9. This preferred form of holder 11 comprises a scissors-like or tong-like device, having two opposed jaws 25 fixed on the ends of lever arms 26 which are pivoted together at 27. The arms 26 extend beyond the pivot 27 and have handles 28 thereon which may be pressed together to grip one end of a fish between the opposed jaws 25. The opposed faces of the jaws 25 are preferably arcuate in cross-section as shown in Fig. 8 and have transversely extending rows of teeth 29 as shown in Figs. 8 and 9.

When a fish has been gripped between the jaws 25, as above explained, it is lifted and placed in the box 10, and in order that the holder 11 may maintain its grip on the fish during the entire scaling operation, the end wall 16 has a vertical slot 30 extending downwardly from its upper edge, the slot being of a sufficient width to permit the arms 26 (between the pivot 27 and the jaws 25) to be lowered transversely into the slot 30. Thus the user continues to grip the fish after it is placed in the box, and the slot 30 extends downwardly for a sufficient distance to permit the holder to extend in a generally horizontal direction.

Preferably the box is provided with a supporting means for the fish, and this means as herein shown comprises a foraminated or diamond mesh rack 31 with supporting legs 32 along its edges whereby to space the upper supporting surface of the rack from the bottom wall 13. Thus the scales removed from the fish have a tendency to fall through the holes in the rack onto the bottom wall 13. In the preferred form shown the rack 31 has a longitudinally extending depression or groove 33 formed midway between its edges so that the fish will tend to rest in the lateral center of the box as indicated in Fig. 2. It will be evident in Figs. 1, 3 and 7 that the arms 26 of the holder 11 are quite long between the pivot and the jaws 25, and lie close together throughout this length, so that the user may readily shift or turn the fish within the box simply by manipulation of the handles 28 of the holder exteriorly of the box.

Since the scales loosened or scraped from the fish within the box will in some instances tend to fly toward the slot 30, means is preferably provided to close substantially the entire slot 30. This means preferably becomes effective as an incident to the closing of the cover 19, and in the form shown comprises a flat closure member 35 depending from and fixed to the cover 19 at the end adjacent to the end wall 16. The clossure member 35, when the cover is closed, is positioned inwardly of and adjacent to the slot 30, and at its lower end is cut away as at 36 to provide for an opening at the lower end of the slot of a sufficient size to permit the desired manipulation of the holder 11.

As hereinbefore pointed out, the scaler device 12 is operable from the exterior of the box while the cover 19 is closed and the fish completely housed. The scaler device 12 in accomplishing the desired removal of the scales is moved back and forth longitudinally of the box while being maintained in contact with the upper surface of the fish within the box. To provide for such manipulation of the scaler device 12, the box 10 is formed to provide a longitudinally extending slot 40 preferably located at the top of the box. In the present form the slot 40 is defined between the edge of the flange 18 and the forward edge of the cover 19, as shown in Fig. 2. It is through this slot 40 that the scaling device 12 projects into the box 10.

In the form herein illustrated the scaling device 12 comprises an elongated handle 41 adapted to be positioned generally horizontally, and from the handle 41 a round connector bar or rod 42 projects downwardly through the slot 40 into the box, and at its lower end a scaling element 43 is substantially supported parallel to the handle 41 and extending in the opposite direction from the rod 42. The scaler element 43 in its present form is of the fixed or scraper type rather than of the rotatable, power driven type, and the scale removing action is dependent solely upon longitudinal movement of the scaler element 43 while held in rubbing contact with the upper surface of the fish.

Thus the scaler element 43 is generally arcuate as shown in Fig. 2, and it has a plurality of rows of teeth 44 on its rounded lower face as shown in Fig. 6. It will be noted that the total length of the scraper element 41 is considerably less than the width of the box 10 so that the element may, by manipulation of its handle 41, be tilted as required. To permit such tilting, the rod 42 is round and of a less thickness than the width of the slot 40.

To prevent flying of scales from the slot 40 during the scaling operation, a baffle plate 45 is suspended from the forward edge of the cover 19 and extends throughout substantially the entire length of the cover 19, the plate 45 preferably being pivotally suspended from hooks 46 on the cover so as not to interfere with the tilting of the scaler device.

When the cover 19 is opened for removal of the scaled fish, the scaler device may be placed with the rod portion 42 thereof between a bracket 47 and the forward wall 15, thereby to maintain the scaler in a convenient position for grasping to perform the next operation.

In the form shown in Fig. 4 of the drawings, the device is simplified for home use, the box 10 being of the same general form but with the cover 19 so formed as to eliminate the slot 40. Thus the top of the box 10 is completely closed, and the scaling of the fish within the box is accomplished by means operated through the slot 30 in the end wall 16 of the box. For this purpose a scaling element 48 is provided having teeth 44 along its lower face, and having an actuating rod 49 secured thereto. The rod 49 is of such a size that it may extend through the slot 30, and it has a handle 50 on its outer end. The rod 49 is, of course, long enough to permit the scaler element 48 to engage the fish adjacent to the opposite end of the box. If desired a cover plate may be provided for the slot 30 of Fig. 4 in a form similar to the plate 35 of Fig. 2.

To clamp the fish in position, the device of Fig. 4 preferably has a holding means associated with the end wall 17. In the embodiment shown this holding means is in the form of a stationary clamp having toothed opposed jaws 51 and 52, the jaw 51 being stationarily mounted on the wall 17, while the jaw 52 is pivoted at 53 and is urged toward active clamping position by a spring 54.

With the full and complete enclosure of the fish during scaling, the operation may be performed faster and more vigorously than when the scales are permitted to fly freely about the store, and hence there is a marked saving of time incident to the use of the present device. This time advantage is in addition to the ease of cleaning up the apparatus and to the advantages of complete sanitation due to true confinement of the scales during the operation.

Since the fish may be scaled with the device of Figs. 1 to 3 without touching with the hands, the scaling operation may be deferred until sale of the fish to the customer, thereby allowing the scales to continue in their natural protective capacity as long as possible. Hence, scale type fish may, through the use of the present device, be sold advantageously in small retail stores or markets. If desired the tongs or holder 11 may also be employed in the cleaning operation, since the fish may be lifted out of the box and placed on an adjacent table, and held with the holder 11 while the entrails are removed with a knife.

It will also be evident that the present device, by confining or trapping all of the scales within the enclosure formed by the box, materially simplifies and reduces the cleaning work required so that it removes one of the major objections heretofore found to the marketing of scale fish in retail stores.

I claim as my invention:

1. Fish scaling apparatus of the character described comprising, in combination, an elongated box having side, bottom and end walls, said box having an open top, said box having a slot in one end wall opening upwardly through the upper edge of said end wall, a pair of tongs adapted to grasp one end of a fish to place the same in said box, said tongs having a handle portion adapted to be placed so as to extend through said slot with said tongs engaging the fish within the box and a part of the handle projecting through said slot for manipulation externally of said box, a cover wall for closing said open top of said box, said cover having a transparent window section therein through which the user may see the fish within the box, means operable to close a substantial portion of the slot in said end wall when said cover is closed, said cover being formed to provide, when the cover is in its closed position, a slot extending longitudinally of said box between one edge of said cover and the bordering upper edge of the adjacent side wall, a foraminated rack removably positioned on said bottom wall to support a fish a substantial distance above said wall, said rack having a longitudinally extending depression tending to center the fish laterally within the box, a scaper element adapted to scrape the upper surface of a fish within the box, a handle fixed to said scraper element and adapted to extend through said longitudinal slot for manipulation of the scraper from the exterior of the box, and a baffle plate depending from said cover wall along said slot and operable to prevent the flight of scales through said longitudinal slot during a scaling operation.

2. Fish scaling apparatus comprising, in combination, an elongated box having side, bottom and end walls, and an open top, said box having a slot in one end wall opening upwardly through the upper edge of said end wall, a pair of tongs adapted to grasp one end of a fish to place the same in said box, said tongs having a handle portion adapted to be placed so as to extend through said slot with said tongs engaging the fish within the box and a part of the handle projecting through said slot for manipulation externally of said box, a cover wall for closing said open top of said box, said cover having a transparent window section therein through which the user may see the fish within the box, means operable to close a substantial portion of said slot when said cover is closed, said cover being formed to provide, when the cover is in its closed position, a slot extending longitudinally of said box between one edge of said cover and the bordering upper edge of the adjacent side wall, a foraminated rack positioned above and in spaced relation to said bottom wall to support a fish, a scaling element adapted to be moved along and in contact with the upper surface of a fish within the box to remove the scales from the fish, and means extending through said slot for manipulation of the scaler element from the exterior of the box.

3. Apparatus of the character described, comprising in combination, an elongated box having side, bottom and end walls and having an open top, clamping means adapted to grasp one end of a fish to hold the fish in position in said box, a cover wall for closing said open top of said box, said cover embodying a transparent window section through which the user may see the fish within the box, a scaler element adapted to be moved along and in contact with the upper surface of a fish within the box to remove the scales therefrom, and means attached to said scaler element and adapted to extend through one of the walls of said box for manipulation of the scaler from the exterior of the box.

4. A device of the character described comprising, in combination, an elongated receptacle having a shiftable door through which a fish may be placed within the receptacle, means forming a transparent window in said receptacle extending longitudinally of said receptacle, said door when closed being adapted to form a slot extending longitudinally of said receptacle, means for holding a fish in a predetermined longitudinal position within said receptacle, and a scaling device shiftably positioned within said receptacle and having an operating element extending through said slot for manipulation exteriorly of the receptacle.

5. Fish scaling apparatus comprising, in combination, an elongated enclosure having an opening through which a fish may be introduced into said enclosure and having a door for closing said opening, a scaler within the enclosure, and means operable from the exterior of said enclosure while said door is closed to move said scaler longitudinally over the fish to remove the scales from the fish.

6. Apparatus of the character described comprising, in combination, an elongated box having a door opening through which a fish may be introduced into the box, a closure for said door opening, a rack for supporting such a fish within the box, means for fixing the fish against longitudinal shifting in the box, and a scaler shiftable longitudinally within the box while said closure is closed to remove the scales from the fish.

7. Fish scaling apparatus comprising, in combination, an elongated receptacle having a shiftable door through which a fish may be placed within the receptacle, means forming a transparent window in said receptacle extending longitudinally of said receptacle, said door when closed being adapted to form a slot extending longitudinally of said receptacle, means for holding a fish in a predetermined longitudinal position within said receptacle, a foraminous rack for supporting the fish in spaced relation to the wall of the receptacle, and a scaling device shiftably positioned within said receptacle and having an operating element extending through said slot for manipulation exteriorly of the receptacle.

8. Fish scaling apparatus comprising, in combination, walls forming an elongated enclosure having a door opening therein through which a fish may be introduced into said enclosure and having a shiftable closure wall for closing said opening, a scaler within the enclosure, one of said walls having an operating opening therein, and an operating handle attached to said scaler and extending through said operating opening whereby said scaler may be shifted longitudinally over the fish to remove the scales from the fish while said closure wall is maintained in its closed position.

9. Apparatus of the character described comprising, in combination, an elongated box having a door opening through which a fish may be introduced into the box, a closure for said door opening, clamping means for fixing the fish against longitudinal shifting in the box, said clamping means being manipulatable exteriorly of the box to turn the fish over within the box, and a scaler shiftable longitudinally within the box while said closure is closed to remove the scales from the fish.

10. A fish scaling apparatus, comprising, in combination, walls defining a substantially closed elongated receptacle having a shiftable door through which a fish may be placed within the receptacle, means forming a transparent window in said receptacle extending longitudinally of said receptacle, said receptacle having a longitudinally extending slot and another opening formed therein, means for holding a fish in a predetermined longitudinal position within said receptacle, said holding means being adapted to extend through said opening for manipulation from the exterior of the receptacle, a scaling device shiftably positioned within said receptacle and having an operating handle extending through said slot for manipulation exteriorly of the receptacle, and a pair of guard members carried by said door in positions adapted when said door is closed to prevent flight of scales through said slot and said opening respectively during the scaling operation.

11. Fish scaling apparatus comprising, in combination, walls defining an elongated enclosure having a door adapted to be opened to introduce a fish into said enclosure, one of said walls having a transparent window section therein through which the user may view the fish, a means within said enclosure for supporting the fish, and scaling means within said enclosure operable to remove the scales from the fish while said door is maintained in its closed position.

12. A fish scaling apparatus comprising an elongated box having a bottom wall and side and end walls defining an open top and having a cover hinged at one of its edges along the top of one of said side walls and shiftable on its hinge to a horizontal position wherein it closes said top of the box, said cover having a transparent window therein, a rack in said box and supported removably adjacent to but spaced from said bottom wall, and a scraper positioned within said box, and means operable from the exterior of said box while said cover is closed to reciprocate said scraper longitudinally within said box.

13. Fish scaling apparatus comprising, in combination, walls defining an elongated enclosure having a door adapted to be opened to introduce a fish into said enclosure, one of said walls having a transparent window section therein through which the user may view the fish, a means within said enclosure for supporting the fish, and scaling means within said enclosure, one of said means being mounted for relative movement longitudinally with respect to said enclosure.

14. Fish scaling apparatus comprising, in combination, walls defining an elongated enclosure having a door adapted to be opened to introduce a fish into said enclosure, one of said walls having a transparent window section therein through which the user may view the fish, a means within said enclosure for supporting the fish, an elongated fish scaling means located within said enclosure and extending transversely thereof, said two means being mounted for relative movement in a direction longitudinally of said enclosure and for relative movement laterally of said enclosure, and means operable from the exterior of said enclosure for producing such relative movement.

CARL J. RINDT.